Sept. 24, 1929.  H. C. HAYES  1,729,595
DISTANCE MEASURING DEVICE
Filed March 23, 1927  2 Sheets-Sheet 1

Inventor
HARVEY C. HAYES

By Robert A. Lavender
Attorney

Sept. 24, 1929.    H. C. HAYES    1,729,595
DISTANCE MEASURING DEVICE
Filed March 23, 1927    2 Sheets-Sheet 2

Inventor
HARVEY C. HAYES

By Robert A. Lavender
Attorney

Patented Sept. 24, 1929

1,729,595

UNITED STATES PATENT OFFICE

HARVEY C. HAYES, OF WASHINGTON, DISTRICT OF COLUMBIA

DISTANCE-MEASURING DEVICE

Application filed March 23, 1927. Serial No. 177,745.

(GRANTED UNDER THE ACT OF MARCH 3, 1883, AS AMENDED APRIL 30, 1928; 370 O. G. 757)

My invention relates broadly to distance finders and more particularly to sonic depth measuring apparatus.

The object of my invention is the production of a sonic depth finder that produces either an audible or a visible record of the depth measured or that will produce a combination of the two when it is so desired.

Another object of my invention is the production of a sonic depth finder in which the records may be made photographically.

Further objects of my invention will appear more fully hereinafter as the description of the method and apparatus is developed.

It is well known that a signal may be sent from a vibrating diaphragm toward the bottom of the sea and an echo will be received therefrom at the end of an interval of time. Since the velocity of a sound wave in water is well known, the depth of the sea at any particular point may be computed from the length of the interval of time between the sending of the signal from the diaphragm and the receipt of the returned echo. Substantially all of the present devices operating upon this principle depend upon the aural sense to determine the length of the time interval. In this connection it is well known that the optic sense is much more highly activated and accurate than the aural sense.

In the measuring instrument that I have developed, I utilize the optic sense to determine the length of the interval between the transmission of the sonic signal and the receipt of the echo from the sea bottom. By this method I have eliminated the inaccuracies inherent in the type of instrument that requires the "matching" of the transmitted signal with the signal created by the received echo.

My invention consists substantially in the construction, combination and arrangement of parts associated therewith or as will be more fully hereinafter set forth as shown by the accompanying drawings and finally pointed out in the appended claims.

Reference is to be had to the accompanying drawings forming a part of this specification in which like reference characters indicate corresponding parts throughout the several views and in which:—

Figure 1:
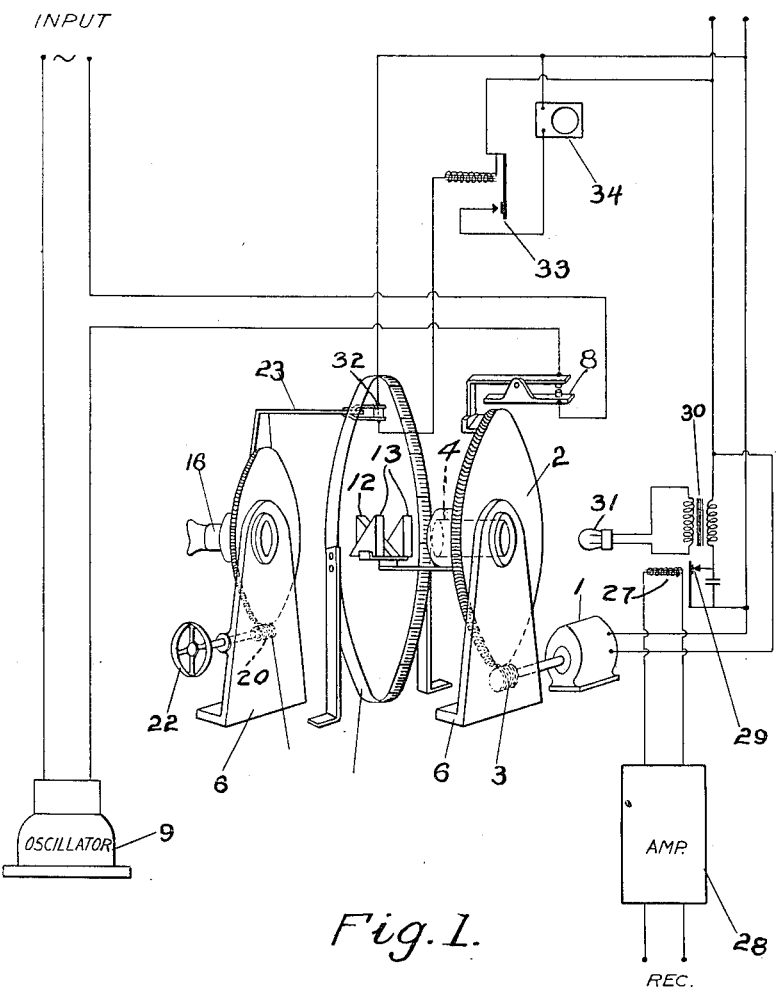
Figure 1 is a diagrammatic showing of the apparatus and the circuit connections therefor.
Figure 2:
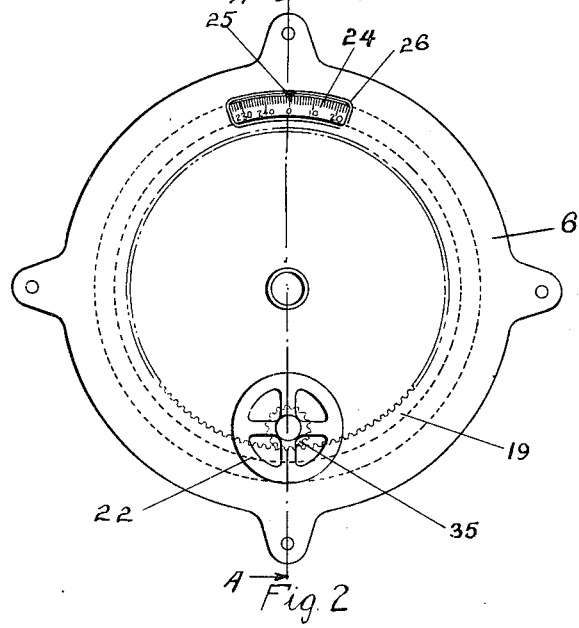
Figure 2 is a front elevational view of the device.
Figure 3:
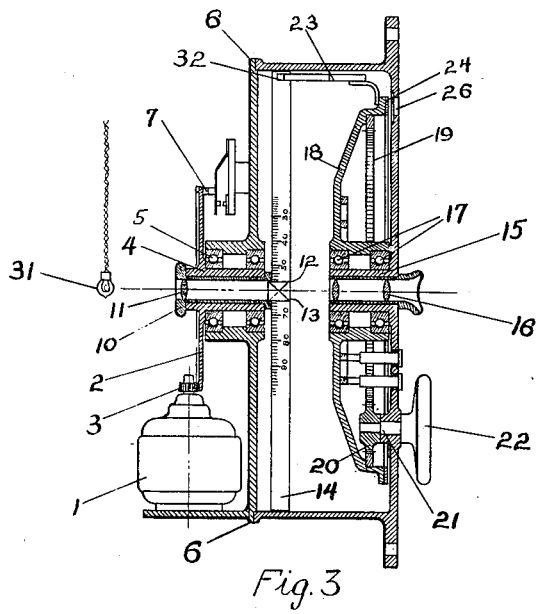
Figure 3 is a sectional view of the device along the line A—A of Figure 2.

Referring to the drawings numeral 1 indicates a speed regulated motor used to rotate a large disc member 2 through the medium of gearing 3. The disc member 2 is mounted upon a hollow shaft 4 that rotates in ball baring races 5 which are held by a portion of casing 6. Near the periphery of the disc 2 is a cam 7 that operates the electrical contacts 8 in the electrical circuit of the sonic oscillator 9 upon each rotation of the disc 2.

Within the hollow shaft 4 is a member 10 that carries a lens 11 in alignment with two prisms 12 and 13. The prisms 12 and 13 are so arranged within the hollow shaft that they direct a beam of light entering the system in a direction parallel with the axis of the hollow shaft 4 upon a circular scale 14 that is mounted upon the casing 6.

Directly opposed to the system within the hollow member 10 and mounted within the bearing 15 of the casing 6 is an eye piece with a lens system 16. This lens system contains the cross-hair indicating lines of the usual microscope mounting and is focused through the prism 12 upon the scale 14.

Surrounding the bearing 15 of the casing 6 are ball bearing races 17 that carry a member 18 rotatable about the axis of the bearing 15. The member 18 carries a ring gear 19 that engages a gear 20 upon the end of a shaft 21. This shaft extends through the casing 6 and terminates at its outer end with a wheel 22.

The member 18 carries an arm 23 that extends across the casing 6 and terminates adjacent the face of the scale 14. Upon the end of the arm 23 is a selenium cell 32 or other light sensitive cell that is connected in series with the coil of a relay 33. This relay operates an audible alarm 34 such as an electric bell. The function of this light sensitive cell and the audible alarm is hereinafter described in connection with the operation of the device. The member 18 also carries a scale 24 with its zero calibration unit at the point where the arm 23 joins the member 18. The relative position of the member 18 about the axis of the bearing 15 is indicated by means of an index 25 within the opening 26 in the face or casing 6.

In the electrical circuits of the device as shown in Figure 1, the electrical contacts 8 close and open the circuit of the sonic oscillator 9.

A second electric circuit is provided which includes a sonic receiver connected at the points REC, an amplifier 28 and a relay 27. The reaction of the current within the coil of the relay 27, induced therein by the reception of a sonic signal, opens the contacts in the primary side of a power circuit that includes a transformer 30, across the secondary of which is a lamp 31. The lamp 31 is placed at a point in line with the axis of the lens system 11. The light from the lamp is focused upon the scale 14 by means of the lens system 11 and the prisms 12.

The operation of the device is as follows: as the disc 2 rotates it closes the contacts 8 in the electrical circuit of the sonic oscillator 9 thereby causing sonic signals to be sent out. After the sonic signals have traversed the distance to be measured and the echo has returned to the receiver and activated the same, the light 31 is flashed and projected upon the scale 14, the distance between the zero position of the scale and the point at which the light from the lamp 31 is projected upon the scale indicating the amount of rotation of the disc 2. This point is visualized through the eyepiece lens system 16 and the prism 13. The calibration point upon the scale 14 made visible by the flash of the light 21 therefore indicates the distance being measured.

The light sensitive cell may be rotated to the point on the scale corresponding to a depth, indicated by the scale 24, that a navigator may desire to be cognizant of. As the depth of the water beneath the vessel increases or decreases to the predetermined depth, the light from 31 follows along the scale until it reaches the location of the cell when the reaction of the light upon the cell operates the audible alarm through the circuits described. The direct readings of the depth may be obtained from either of the scales 14 or 24.

Should it be desired to retain a permanent record of the depths covered by the ship a portion of the scale 14 may be covered with light sensitive paper that, when developed, gives a permanent record of the positions upon the scale to which the light from the lamp 31 has projected.

It will be understood that the above description and accompanying drawings comprehend only the general and preferred embodiment of my invention and that minor detail changes in the construction and arrangement of parts may be made within the scope of the appended claims without sacrificing any of the advantages of my invention. The invention herein described may be manufactured and used by or for the Government of the United States for governmental purposes without the payment to me of any royalty thereon or therefor.

Having thus described my invention what I claim is:—

1. In a sonic depth finder including a sonic oscillator, an electrical circuit therefor, a sonic receiver and an electrical circuit therefor, the combination of a casing, a hollow shaft journalled within the casing, means for rotating the shaft at constant speed, means in the electrical circuit of the said sonic oscillator associated with said hollow shaft for operating said oscillator, a scale within the casing, a lamp in the electrical circuit of the sonic receiver and in axial alignment with the hollow shaft, means for producing a flash in said lamp upon reception of a sonic signal, means rotatable with said shaft for directing the light from said lamp upon said scale, an eyepiece in axial alignment with said shaft and means upon said shaft for directing the line of vision to that portion of the scale illuminated by the light from said lamp.

2. In a sonic depth finder including a sonic oscillator, an electrical circuit therefor, a sonic receiver and an electrical circuit therefor, the combination of a cylindrical casing, a hollow shaft journalled within the casing, means for rotating the shaft at a constant speed, a scale upon the inner surface of the cylindrical casing, electrical contacts within the electrical circuit of the sonic transmitter and mounted upon the casing, means for operating said contacts by said shaft, a lamp in the electrical circuit of the sonic receiver and in axial alignment with the hollow shaft, prisms mounted upon the shaft and rotatable therewith for directing the light of said lamp upon the scale, an eyepiece in axial alignment with said shaft and another prism upon the shaft and rotatable therewith for directing the line of vision from the eyepiece to that portion of the scale illuminated by the light from said lamp.

3. In a sonic depth finder including a sonic oscillator, an electrical circuit therefor, a sonic receiver and an electrical circuit therefor, the combination of a casing, a hollow shaft journalled within the casing, means for rotating the shaft at a constant speed, means in the electrical circuit of the said sonic oscillator associated with said hollow shaft for operating said oscillator, a scale within the casing, a lamp in the electrical circuit of the sonic receiver, and in axial alignment with the hollow shaft, means for producing a flash in said lamp upon reception of a sonic signal, means rotable with said shaft for directing the light from said lamp upon said scale, a spindle within said casing and in axial alignment with said shaft, a member rotatably mounted upon said spindle, a light sensitive cell upon said member and located adjacent said scale, means for moving said cell over the surface of said scale and an index scale upon said member for determining the relative position of said cell with reference to said first mentioned scale.

4. In a sonic depth finder including a sonic oscillator, an electrical circuit therefor, a sonic receiver and an electrical circuit therefor, the combination of a cylindrical casing, a hollow shaft journalled within the casing, means for rotating the shaft at a constant speed, a scale upon the inner surface of the cylindrical casing, electrical contacts within the electrical circuit of the sonic transmitter and mounted upon the casing, means for operating said contacts by said shaft, a lamp in the electrical circuit of the sonic receiver and in axial alignment with the hollow shaft, prisms mounted upon the shaft and rotatable therewith for directing the light of said lamp upon said scale, a spindle within the casing and in axial alignment with said shaft, an eyepiece within the spindle, another prism upon the shaft and rotatable therewith for directing the line of vision for the eyepiece to that portion of the scale illuminated by the light of said lamp, a member rotatably mounted upon the spindle, a light sensitive cell upon said member, and located adjacent said scale and means for moving said cell over the surface of said scale and an index scale upon said member for determining the relative position of said cell with reference to said first mentioned scale.

HARVEY C. HAYES.